(12) United States Patent
Yamaguchi et al.

(10) Patent No.: US 6,758,602 B2
(45) Date of Patent: Jul. 6, 2004

(54) OPTICAL CONNECTOR AND OPTICAL CONNECTOR FERRULE TO BE USED THEREIN

(75) Inventors: Tadashi Yamaguchi, Kurobe (JP); Tetsuya Katsumi, Kurobe (JP); Mamoru Ishida, Sendai (JP); Hitoshi Ofune, Uozu (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/180,315

(22) Filed: Jun. 27, 2002

(65) Prior Publication Data

US 2003/0002817 A1 Jan. 2, 2003

(30) Foreign Application Priority Data

Jun. 28, 2001 (JP) .......................................... 2001-197175

(51) Int. Cl.⁷ ................................................ G02B 6/36
(52) U.S. Cl. .............................. 385/78; 385/91; 385/92
(58) Field of Search .............................. 365/78, 88, 89, 365/91, 92, 93, 94

(56) References Cited

U.S. PATENT DOCUMENTS

| | | | | |
|---|---|---|---|---|
| 4,722,584 A | * | 2/1988 | Kakii et al. | 385/80 |
| 5,778,125 A | * | 7/1998 | Busse et al. | 385/80 |
| 5,862,280 A | * | 1/1999 | Tanaka et al. | 385/78 |
| 5,975,770 A | * | 11/1999 | Yanagi et al. | 385/78 |
| 6,120,191 A | * | 9/2000 | Asakura et al. | 385/93 |
| 6,158,900 A | | 12/2000 | Omiya et al. | 385/78 |
| 6,273,620 B1 | * | 8/2001 | Kato et al. | 385/88 |

FOREIGN PATENT DOCUMENTS

| | | | |
|---|---|---|---|
| JP | 10-186176 | | 7/1998 |
| JP | 11-344639 | * | 12/1999 |
| JP | 2001-1130 | * | 1/2001 |
| JP | 2001-33652 | * | 2/2001 |
| JP | 2001-33657 | * | 2/2001 |
| JP | 2001-108866 | * | 4/2001 |

* cited by examiner

*Primary Examiner*—Chandrika Prasad
(74) *Attorney, Agent, or Firm*—Finnegan, Henderson, Farabow, Garrett & Dunner, L.L.P.

(57) ABSTRACT

An optical connector comprises a mount having an accommodating portion and an optical connector ferrule. The mount and the outer surface of the optical connector ferrule to be brought into contact therewith are made of the same kind of material, thereby securing the good weldability therebetween. In one embodiment, both the mount and the ferrule are made of an amorphous alloy. In another embodiment, the mount is made of a metal, for example stainless steel, and the ferrule comprises a body made of an amorphous alloy and a surface part covering the outer surface of the body is made of the same kind of material as the mount, i.e. a metal such as stainless steel.

11 Claims, 7 Drawing Sheets

OPTICAL CONNECTOR AND OPTICAL CONNECTOR FERRULE TO BE USED THEREIN

BACKGROUND OF THE INVENTION

1. Field of the Invention

This invention relates to optical connectors for connecting and/or fixing optical fiber ends or optical fiber cable ends to be used in optical communications and optical connector ferrules to be used therein, particularly optical connector ferrules having a metal tube incorporated therein as an integral part thereof (hereinafter referred to occasionally as "optical connector ferrule of the metal tube built-in type"). The term "ferrule" used herein collectively refers to a capillary-shaped ferrule (also called "capillary") and a ferrule having a flange part.

2. Description of the Prior Art

When an optical connector ferrule is connected to a semiconductor laser module to be used as a light source for an optical communication device and the like, a mount for attachment to a module is commonly used. Now, the relation between the ferrule and the mount is explained with reference to FIG. 1.

FIG. 1 illustrates one example of a conventional butterfly type LD module. An optical unit 20 assembled in advance is placed and fixed in a butterfly package 23. Reference numeral 24 denotes a group of package electrode terminals of the butterfly type which connect a driving power source to a laser diode (LD) 21 of the optical unit 20 and are adapted to be connected to electrode terminals of an optical system for monitoring the driving state. Two groups of electrode terminals 24 are respectively attached to both sidewalls of the package body as opposed to each other. A ferrule 1 into which a leading end of an optical fiber 2 is fitted is connected to the butterfly package 23 via a mount 10 for attachment to a module. Laser beams emitted from the laser diode 21 are collected by aspherical lenses 22 and 11 and introduced into the optical fiber 2 embedded in the ferrule 1 at the leading end thereof.

Heretofore, the ferrule 1 has been generally manufactured from ceramics such as zirconia and preliminarily press-fitted into the tube-shaped mount 10 made of stainless steel. This mount 10 is attached to the butterfly package 23 by laser welding. In the diagram the welding positions are indicated by the reference sign "X".

Parts for optical connectors are required to have high dimensional accuracy in order to prevent the loss of light. The conventional method for the production of an optical connector ferrule (capillary) comprises the steps of first molding a ceramic powder containing a binder by injection molding, extrusion molding or the like thereby forming a ferrule blank, sintering the resultant blank, and finishing the blank into a desired dimension by subjecting it to machining such as abrasive finishing of the outside diameter, abrasive finishing of the inside diameter, and polishing of the leading end into the spherical convex surface (PC polishing). Since the inside diameter of a small hole of the ferrule for the insertion of an optical fiber is very small (for instance, the diameter of the small hole of the capillary of the SC type is 0.126 mm), the wire lapping finishing is commonly used for the finishing of the inside diameter thereof. Accordingly, the process of production is lengthy and requires expensive apparatuses such as an inside diameter finishing machine and an outside diameter finishing machine, and the cost of production is inevitably large.

In order to solve the problems mentioned above, the assignee of this application has already proposed to manufacture the ferrules from an amorphous alloy (Japanese Patent Application, KOKAI (Early Publication) No. 10-186176).

SUMMARY OF THE INVENTION

The use of amorphous alloy has such advantages that the ferrules satisfying the dimensional accuracy and the surface quality required of optical connector ferrules can be manufactured by a metal mold casting method with high mass productivity and in a single process and further that such machining steps as outside diameter finishing and inside diameter finishing of the ferrule can be diminished markedly. However, the weldability of an amorphous alloy to a metal such as stainless steel commonly used as a material of the mount 10 mentioned above is poor and thus the ferrule made of an amorphous alloy cannot be joined to the mount with sufficient strength. Therefore, it poses a problem that the ferrule made of an amorphous alloy can be used as a part of module only with difficulty.

It is, therefore, an object of the present invention to improve the joining properties or weldability of the ferrule made of an amorphous alloy and having excellent properties and advantages as mentioned above to a mount for attachment to a module and enable the ferrule to be used as a part of the module.

A further object of the present invention is to provide an optical connector ferrule having excellent optical properties, which ferrule can be joined or welded to a mount even when the mount made of a metal such as stainless steel is used and can be used as a part of the module.

To accomplish the objects mentioned above, a first aspect of the present invention provides an optical connector. A first embodiment thereof is directed to an optical connector comprising a mount having an accommodating portion or space and an optical connector ferrule attached to the mount, wherein the mount and at least the outer surface of the optical connector ferrule are made of the same kind of material and the ferrule is integrally joined to the mount. This embodiment includes the case that both the mount and the optical connector ferrule mentioned above are made of an amorphous alloy.

A second embodiment of the present invention is directed to an optical connector comprising a mount having an accommodating portion or space and an optical connector ferrule attached to the mount, wherein the optical connector ferrule comprises a body and a surface part covering the outer surface of the body, and the mount and the surface part mentioned above are made of the same kind of material and are integrally joined to each other.

Another aspect of the present invention provides an optical connector ferrule which can be advantageously used in this embodiment. The optical connector ferrule is characterized by comprising a body made of an amorphous alloy having at least a glass transition region and a surface part of an existing metal material covering the outer surface of the body.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

The fundamental characteristic feature of the present invention, for the purpose of improving the joining properties or weldability of a ferrule made of an amorphous alloy having excellent properties and advantages as mentioned above to a mount for attachment to a module and enabling the ferrule to be used as a part of a module, resides in the fact that the mount and the outer surface of the optical connector ferrule to be brought into contact therewith are made of the same kind of material, thereby securing the good weldability. The embodiments of this feature include an embodiment wherein both the mount and the ferrule mentioned above are made of an amorphous alloy and an embodiment wherein the mount is manufactured from a metal, for example stainless steel (SUS) as in the conventional manner, and the ferrule comprises a body made of an amorphous alloy and a surface part covering the outer surface of the body and made of the same kind of material as the mount, i.e. a metal such as stainless steel. In either embodiments, it is possible to securely fix the ferrule made of substantially an amorphous alloy to the mount by welding because the joining properties or weldability between the amorphous alloys or between the metal materials are excellent. Incidentally, the same kind of material (amorphous alloy-amorphous alloy or metal-metal) satisfies the requirement for the weldability and there is no need to be the totally same material. Needless to say, any metals other than stainless steel may be used as a metal.

Accordingly, the ferrules of the metal tube built-in type and/or the center tube built-in type and/or the optical fiber built-in type of the present invention can not only be applied to the optical connectors for connecting the optical fibers by abutting the end faces of the ferrules to each other, but also be used as the parts of LD modules.

Since the ferrules of the metal tube built-in type and/or the center tube built-in type and/or the optical fiber built-in type of the present invention have a body portion made of an amorphous alloy, they exhibit excellent durability, high positional accuracy of an optical fiber fitted therein, and low connector insertion loss. Furthermore, the present invention allows the optical connector ferrules having good concentricity of the inside diameter and the outside diameter thereof to be mass-produced with high efficiency by a simple process. Moreover, the present invention obviates such machining steps as inside diameter finishing of the ferrule, thereby considerably lowering the number of machining steps and, therefore, enables to lower the cost of production of the ferrules.

Now, the present invention will be described more concretely below with reference to the attached drawings which illustrate some embodiments.

Figure 1:
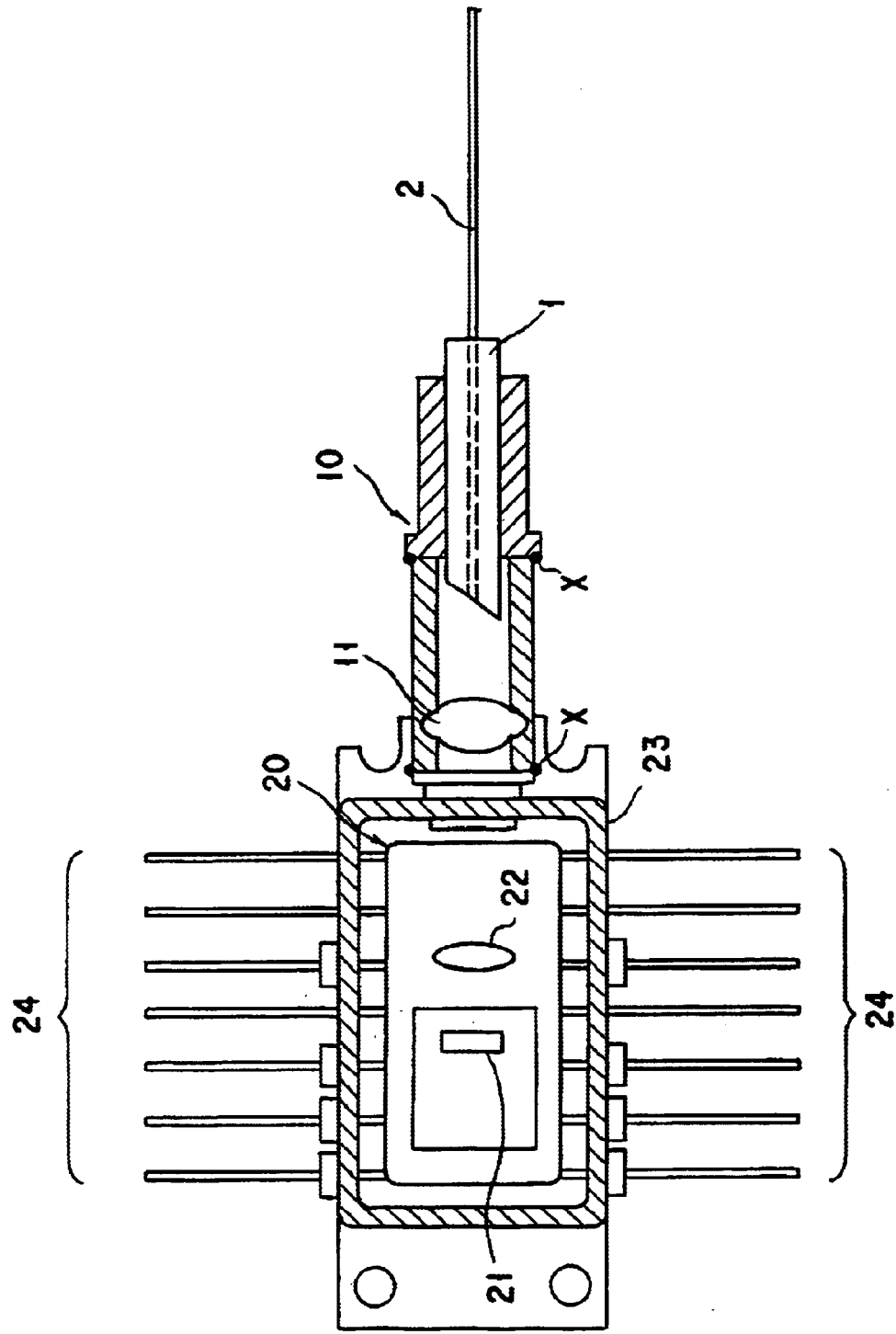
FIG. 1 is a fragmentary cross-sectional view schematically illustrating a conventional butterfly type LD module.
Figure 2:
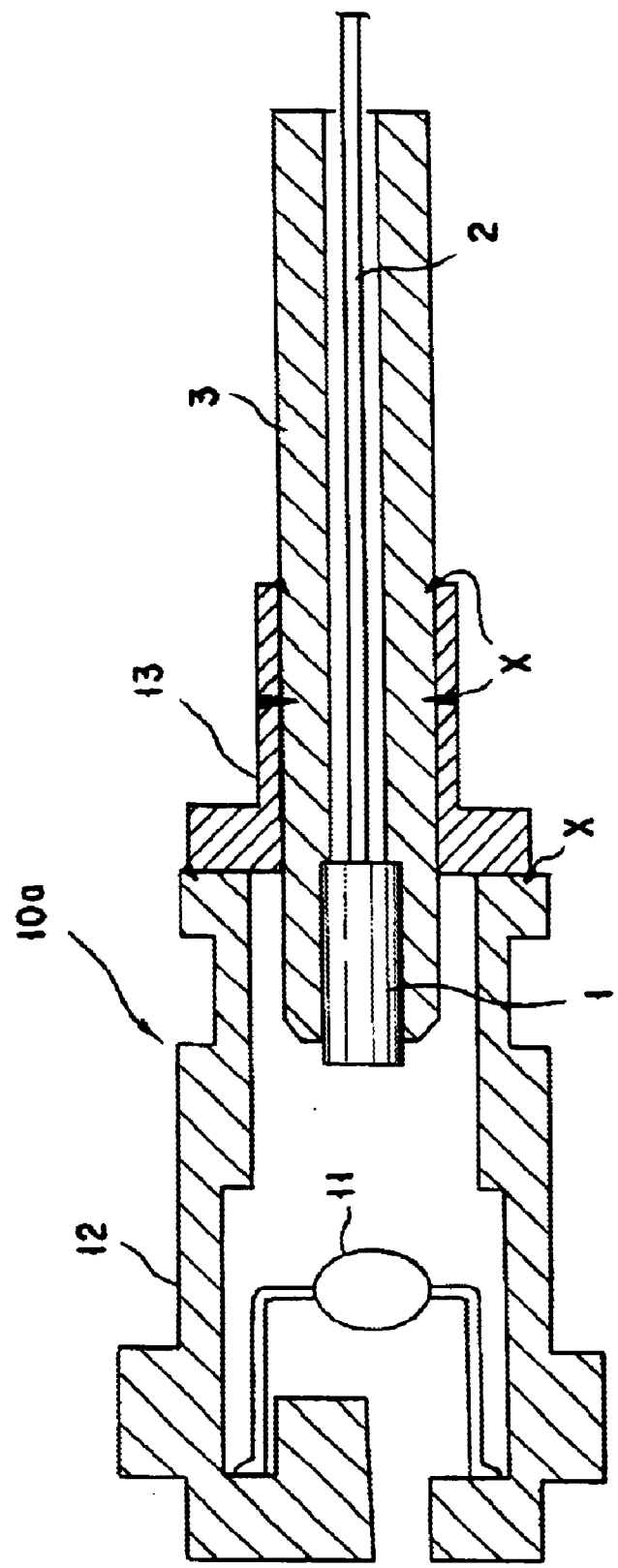
FIG. 2 is a fragmentary cross-sectional view schematically illustrating one embodiment of the joining state between a ferrule of the metal tube built-in type of an optical connector according to the present invention and a mount for attachment to a module.

FIG. 2 illustrates schematically one embodiment of the joining state between a mount for attachment to a module and a ferrule of the metal tube built-in type. The mount 10a comprises a body member 12 for accommodating and fixing a lens 11 and a flange member 13, both the body member and the flange member being made of stainless steel. On the other hand, the ferrule (capillary) 1 into which a leading end of an optical fiber 2 is securely fitted is made of an amorphous alloy and integrally joined into a tube 3 made of a metal (stainless steel). Accordingly, the body of the ferrule is made of an amorphous alloy and a surface part covering the outer surface of the body is formed from a stainless steel tube. This ferrule 1 of the metal tube built-in type is fitted into the stainless steel flange member 13 of the mount 10a and fixedly secured thereto at predetermined positions of the metal (stainless steel) tube 3 by welding. Likewise, the stainless steel flange member 13 of the mount 10a is welded to the body member 12. The reference sign "X" denotes the welding positions. The mount 10a having the ferrule 1 of the metal tube built-in type in the integrally joined state as mentioned above is fixed to a butterfly package of an LD module as shown in FIG. 1.

Figure 3:
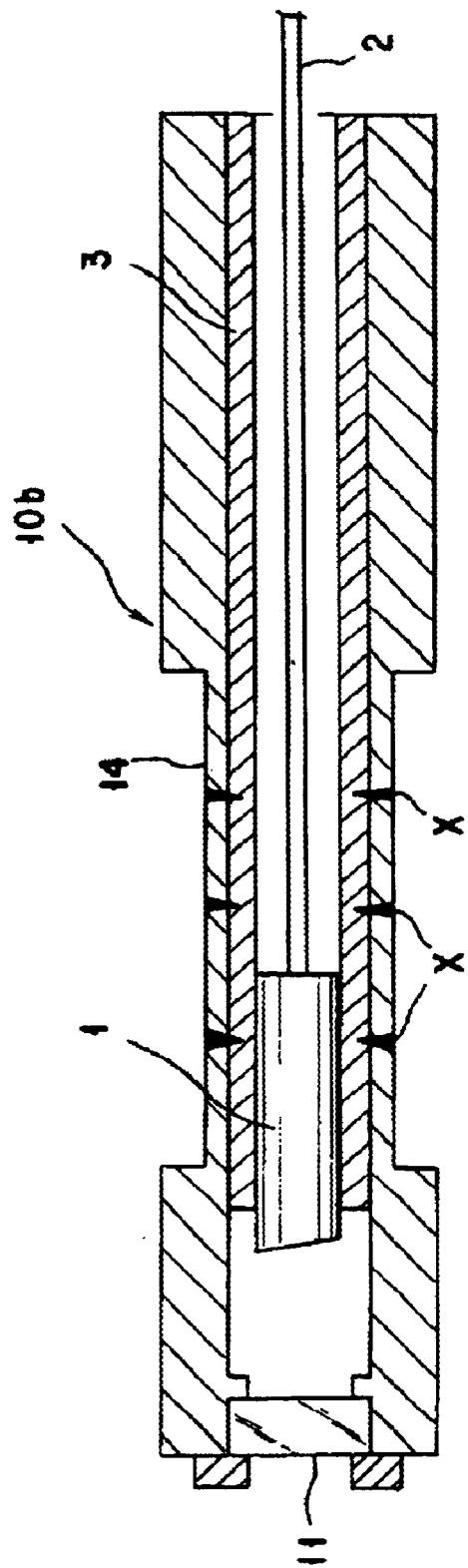
FIG. 3 is a fragmentary cross-sectional view schematically illustrating another embodiment of the joining state between a ferrule of the metal tube built-in type of an optical connector according to the present invention and a mount for attachment to a module.

FIG. 3 illustrates a modified embodiment of the aforementioned embodiment. In this embodiment, lens 11 is attached to one end portion of a mount 10b as in the case of the above embodiment, the mount has a pipe-like shape containing a recessed part 14 for welding at its central portion and the material thereof is stainless steel except the lens 11. Similar to the embodiment mentioned above, the ferrule (capillary) 1 into which the leading end of the optical fiber 2 is securely fitted is made of an amorphous alloy and integrally joined into the tube 3 made of a metal (stainless steel). This ferrule 1 of the metal tube built-in type is fitted into the mount 10b made of stainless steel and fixedly secured thereto at predetermined positions of the metal (stainless steel) tube 3 by welding.

Although the aforementioned embodiments use a stainless steel tube longer than the ferrule, the present invention is not limited to such embodiments. A metal tube having the length substantially equal to that of the ferrule (capillary) may be used instead. Some embodiments of such ferrules of the metal tube built-in type are described below with reference to the drawings.

Figure 4A:
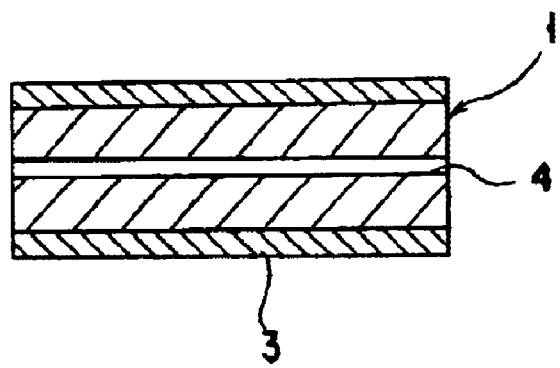
FIGS. 4A and 4B illustrate one embodiment of the ferrule of the metal tube built-in type according to the present invention, FIG. 4A depicting a schematic cross-sectional view and FIG. 4B depicting a schematic side view thereof.
Figure 4B:
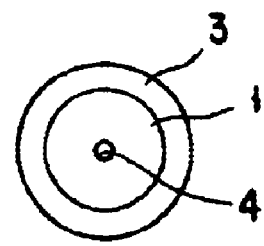

FIG. 4 illustrates an embodiment of the amorphous alloy ferrule (capillary) 1 casted integrally in the metal tube 3. The ferrule 1 has an elongated through-hole 4 for the insertion of an optical fiber (or a basic thread of an optical fiber coated with a plastic thin film) along the axis thereof. Such ferrules of the metal tube built-in type can be easily manufactured by placing a metal tube in a cavity of a mold as mentioned hereinafter and casting an amorphous alloy therein.

Figure 5:
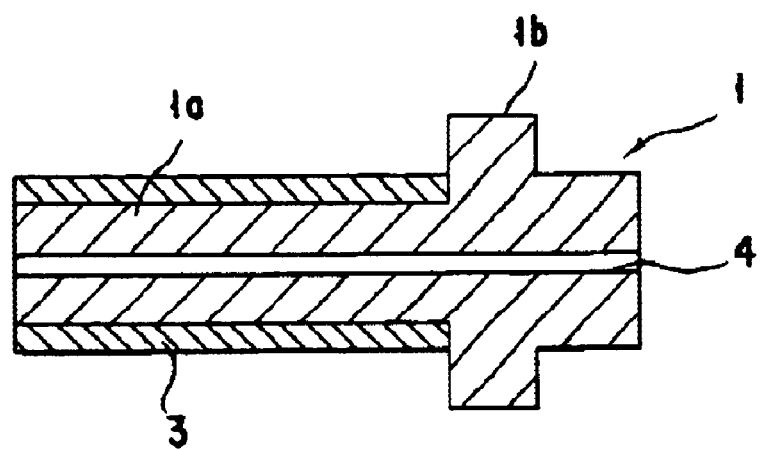
FIG. 5 is a cross-sectional view schematically illustrating another embodiment of the ferrule of the metal tube built-in type according to the present invention.

On the other hand, FIG. 5 illustrates an embodiment of the ferrule 1 having a capillary part 1a and a flange part 1b integrally formed therewith from an amorphous alloy, the capillary part 1a being casted integrally in the metal tube 3.

Figure 6:
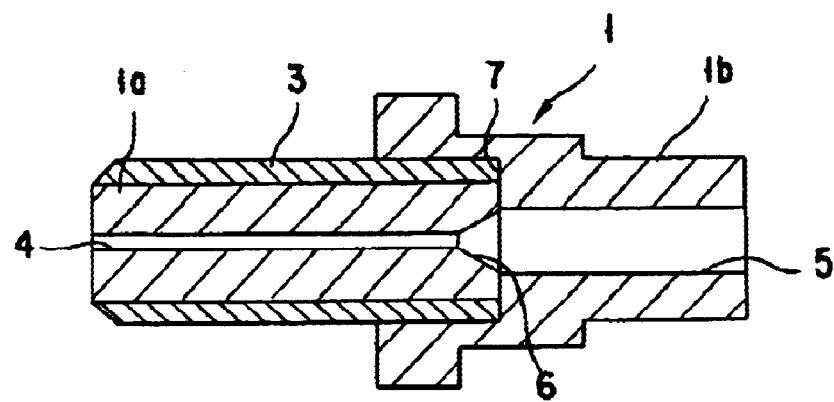
FIG. 6 is a cross-sectional view schematically illustrating still another embodiment of the ferrule of the metal tube built-in type according to the present invention.
Figure 7:
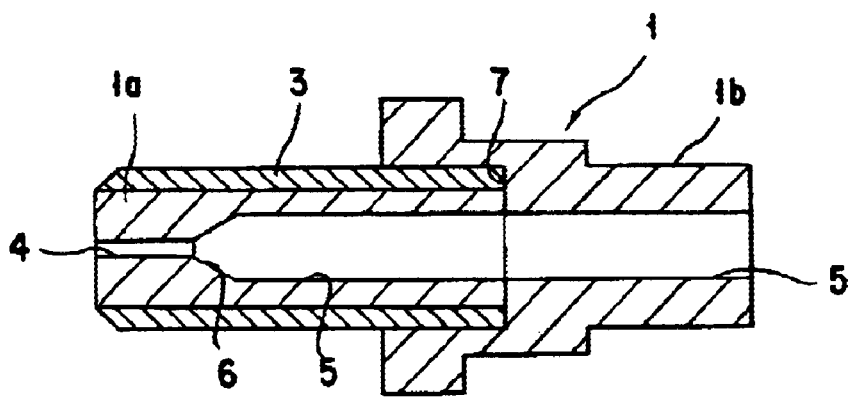
FIG. 7 is a cross-sectional view schematically illustrating yet another embodiment of the ferrule of the metal tube built-in type according to the present invention.

FIG. 6 and FIG. 7 illustrate other embodiments of the ferrule having a capillary part and a flange part as separate components.

Specifically, the ferrule 1 shown in FIG. 6 is composed of the capillary part 1a of which outer surface is covered with a metal tube 3 and which has formed along the axis thereof a through-hole 4 of a small diameter intended for the insertion of an optical fiber and the flange part 1b which has formed along the axis thereof a through-hole 5 of a large diameter for the insertion of a sheathed optical fiber (the optical fiber coated with a sheath). The capillary part 1a is fixed into a leading end recessed part 7 of the flange part 1b by virtue of tight fit or adhesion. The through-hole 4 of the small diameter in the capillary part and the through-hole 5 of the large diameter in the flange part are joined through the medium of a tapered hole part 6.

The ferrule 1 shown in FIG. 7 has the structure similar to that of the embodiment shown in FIG. 6, except that the through-hole 4 of a small diameter intended for the insertion of an optical fiber and the through-hole 5 of a large diameter for the insertion of a sheathed optical fiber are continuously formed in the capillary part 1a along the axis thereof so as to be joined through the medium of the tapered hole part 6.

In either embodiments mentioned above, the flange part 1b may be made of a metal such as stainless steel or an amorphous alloy.

Figure 8:
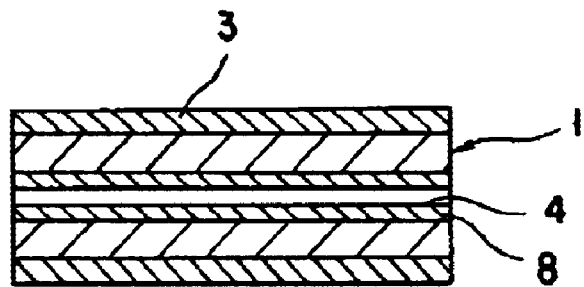
FIG. 8 is a cross-sectional view schematically illustrating one embodiment of the ferrule of the metal tube/center tube built-in type according to the present invention.
Figure 9:
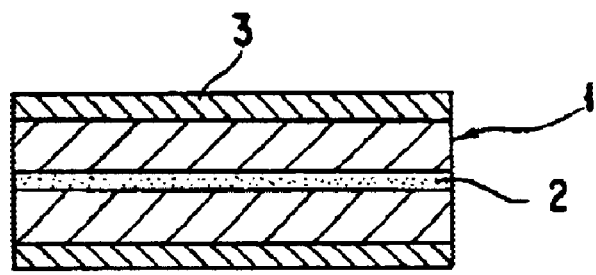
FIG. 9 is a cross-sectional view schematically illustrating one embodiment of the ferrule of the metal tube/optical fiber built-in type according to the present invention.
Figure 10:
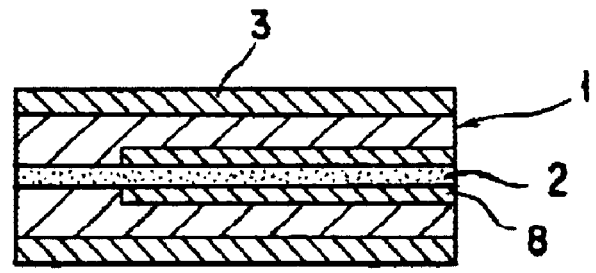
FIG. 10 is a cross-sectional view schematically illustrating one embodiment of the ferrule of the metal tube/central tube/optical fiber built-in type according to the present invention.

FIG. 8 through FIG. 10 further illustrate other embodiments of the ferrule.

In the embodiment shown in FIG. 8, the outer surface of the ferrule (capillary) 1 is covered with a metal tube 3 and a center tube 8 having the through-hole 4 of a small diameter intended for the insertion of an optical fiber is integrally fixed in the inside peripheral part of the ferrule along with the axis thereof.

On the other hand, the embodiment shown in FIG. 9 is identical with the embodiment mentioned above in that the outer surface of the ferrule (capillary) 1 is covered with the metal tube 3, but differs therefrom in that an optical fiber 2 is integrally fixed in the through-hole of the inside peripheral part of the ferrule along the axis thereof.

In the embodiment shown in FIG. 10, the outer surface of the ferrule (capillary) 1 is covered with the metal tube 3, a center tube 8 having the through-hole 4 of a small diameter intended for the insertion of an optical fiber is integrally fixed in the inside peripheral part of the ferrule along the axis thereof, and further the optical fiber 2 is integrally fixed in the through-hole of the center tube 8 along the axis thereof. Although in this embodiment the center tube 8 does not extend throughout the entire length of the ferrule 1, it may be embedded in the ferrule throughout the entire length thereof as shown in FIG. 8. As the center tube 8 mentioned above, a ceramic tube may be used besides a metal tube.

The ferrules mentioned above can be easily manufactured by placing the metal tube in a cavity of a mold along the inside peripheral wall thereof or further placing the center tube and/or the optical fiber along the axis of the cavity and casting an amorphous alloy therein.

An example of the method for the production of the ferrule is-described below with reference to the diagram.

Figure 11:
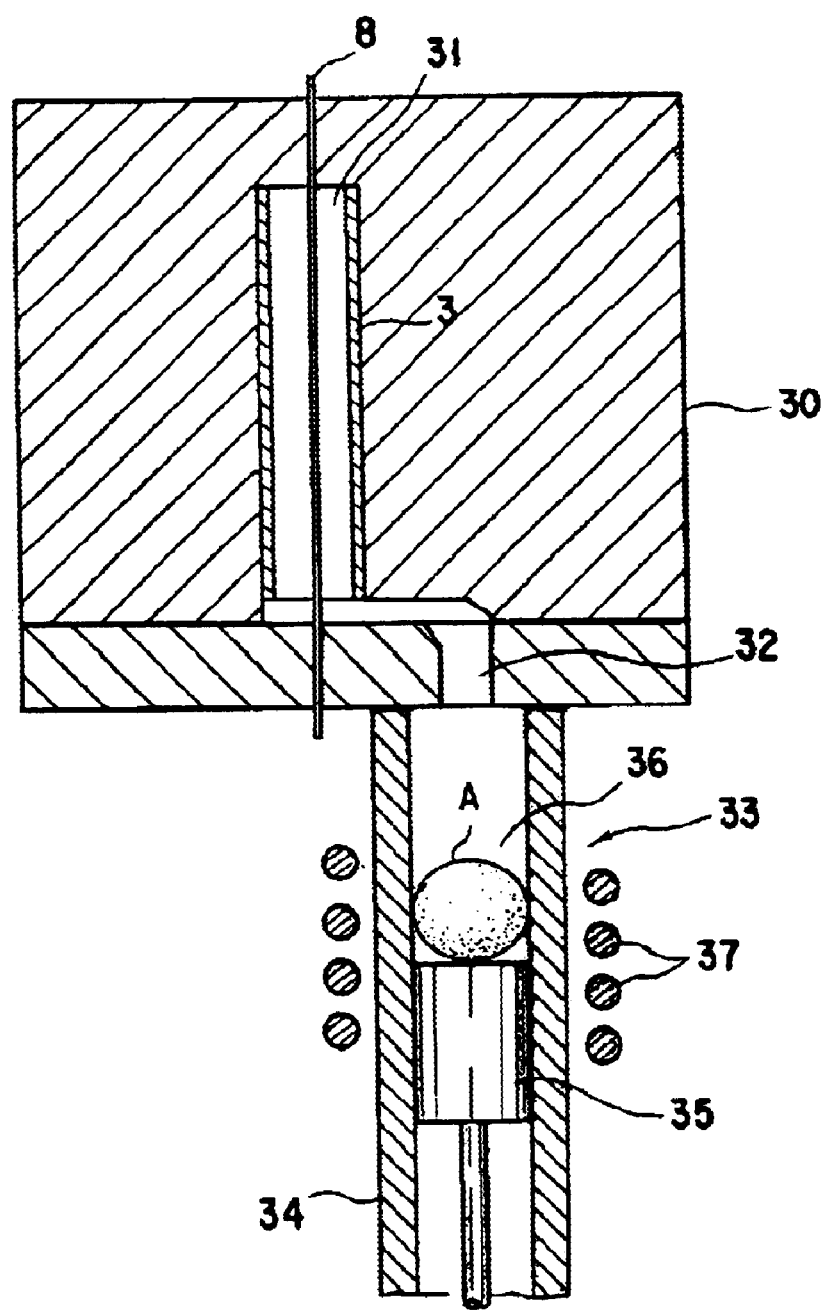
FIG. 11 is a fragmentary cross-sectional view schematically illustrating one embodiment of an apparatus for the production of the ferrule of the metal tube built-in type and/or the center tube built-in type according to the present invention.

FIG. 11 illustrates the schematic construction of one mode of embodying an apparatus and method for the production of the ferrule of the metal tube built-in type or the ferrule of the metal tube/center tube built-in type containing the center tube in the central portion thereof according to the present invention. In the diagram, reference numeral 30 denotes a metal mold provided with a molding cavity 31 adapted to define the outside dimension of the optical connector ferrule. The mold 30 is a split mold which is separable, for example, composed of an upper mold and a lower mold as shown in FIG. 11. A sprue (through-hole) 32 communicating with the cavity 31 is formed in a lower portion of the mold 30.

While the mold 30 can be made of such metallic material as copper, copper alloy, cemented carbide or superalloy, it is preferred to be made of such material as copper or copper alloy which has a large thermal capacity and high thermal conductivity for the purpose of heightening the cooling rate of the molten alloy injected into the cavity 31. The mold may have disposed therein such a flow channel as allow flow of a cooling medium like cooling water or cooling gas.

An injection sleeve (melting vessel) 33 is provided with a cylindrical sleeve 34 and a plunger 35 slidably disposed in the sleeve. The injection sleeve 33 is disposed directly below the sprue 32 of the mold 30 in such a manner as to be reciprocated vertically. The plunger 35 is vertically moved by means of a hydraulic cylinder (or pneumatic cylinder) not shown in the diagram. The upper part of the cylindrical sleeve 34 forms a raw material accommodating part 36 in combination with the upper face of the plunger 35. A high frequency induction coil 37 as a heat source is disposed so as to encircle the raw material accommodating part 36. As the heat source, any arbitrary means such as one resorting to the phenomenon of resistance heating may be adopted besides the high-frequency induction heating. The material of the cylindrical sleeve 34 and that of the plunger 35 are preferred to be such heat-resistant material as ceramics or metallic materials coated with a heat-resistant film.

Incidentally, for the purpose of preventing the molten alloy from forming an oxide film, it is preferred to dispose the apparatus in its entirety in a vacuum or an atmosphere of an inert gas such as Ar gas or establish a stream of an inert gas at least between the mold 30 and the raw material accommodating part 36 of the injection sleeve 33.

The production of the ferrule of the metal tube and/or center tube built-in type according to the present invention is effected by first setting the injection sleeve 33 in a state separated downwardly from the mold 30, placing the metal tube 3 in the cavity 31 of the mold 30 along the inside peripheral wall thereof or further placing the center tube 8 in position so as to extend vertically along the axis thereof, and then charging the empty space inside the raw material accommodating part 36 with the raw material "A" capable of forming an amorphous alloy. The alloying raw material "A" to be used may be in any of the arbitrary forms such as rods, pellets, and minute particles.

Subsequently, as shown in FIG. 11, the injection sleeve 33 is elevated until the upper end thereof abuts against the periphery of the sprue 32 of the mold 30 and the high frequency induction coil 37 is excited to heat the alloying raw material "A" rapidly. After the fusion of the alloying raw material "A" has been confirmed by detecting the temperature of the molten alloy, the high frequency induction coil 37 is demagnetized. Then, the hydraulic cylinder is actuated to effect rapid elevation of the plunger 35 and injection of the molten alloy through the sprue 32 of the mold 30. The injected molten alloy is introduced into the molding cavity 31 and compressed and rapidly solidified therein. In this case, the cooling rate exceeding $10^2$ K/s can be obtained by suitably setting such factors as injection temperature and injection speed, for example. Thereafter, the injection sleeve 33 is lowered and the mold 30 is separated to allow extraction of the cast product. The product is obtained by severing runner parts from the cast product and, as occasion demands, effecting the finishing process such as end portion finishing and PC polishing (polishing to the spherical convex surface).

In such a method, the ferrule is strongly fixed in the metal tube 3 of the outside surface portion and/or the center tube 8 in the central portion integrally without causing any gap therebetween because the amorphous alloy scarcely causes solidification shrinkage after casting, and the ferrule (capillary) of the metal tube built-in type as shown in FIG. 4 through FIG. 7 or the ferrule (capillary) further incorporating the center tube integrally therein as shown in FIG. 8 is obtained. Incidentally, in the case of the ferrule (capillary) shown in FIG. 7, the shape and the size of the through-holes 4, 5, and 6 are defined by the outside dimension of a core pin set in the cavity. Further, when the injection molding is carried out by using an optical fiber instead of the center tube 8 and placing it in the cavity 31 of the mold 30 so as to extend vertically along the axis thereof, the ferrule of the optical fiber built-in type as shown in FIG. 9 is obtained. Moreover, when the injection molding is carried out by placing an optical fiber in the center tube 8 so as to extend along the axis thereof, the ferrule of the optical fiber built-in type as shown in FIG. 10, for example, is obtained. In this case, when the optical fiber is set in the mold so as to have one end thereof continuously extended outward from the mold, the ferrule of the optical fiber built-in type having the optical fiber that continuously extends from one end of the ferrule is obtained.

Since the outer peripheral surface of the metal tube or the inner peripheral surface of the center tube to be used in the above method is smooth and the amorphous alloy allows manufacture of a cast product of smooth surface faithfully reproducing the contour of the cavity of the mold, the ferrule having good concentricity of the inside diameter and the outside diameter can be obtained. Further, since this method obviates such machining steps as inside diameter finishing and outside diameter finishing of the ferrule, the number of machining steps can be considerably lowered. Accordingly, the method of the present invention allows the ferrule (capillary) having a metal tube incorporated therein as an integral part thereof or further having a center tube and/or an optical fiber incorporated therein as an integral part thereof, which ferrule is excellent in the roundness of the diameter of the through-hole and the cylindricity thereof and satisfies a predetermined shape, dimensional accuracy, and surface quality, to be mass-produced with high efficiency by a simple process and, therefore, enables to lower the cost of production of the ferrule.

Incidentally, in the production of the ferrule of the center tube built-in type, there is no need to use a core pin as in the conventional method because the center tube also functions as a core pin. However, it is also possible to use a core pin for the purpose of reinforcing the center tube in strength during the injection molding.

As the material for the center tube, various ceramics such as quartz glass, amorphous oxides, crystalline oxides, and nitrides like $Si_3N_4$ may be used besides various metals such as stainless steel. In the case of ceramics, amorphous oxides (oxide glass) and oxide materials exhibiting smoothness equivalent to that of the amorphous oxide may be advantageously used. Since the quartz glass permits easy machining into a tube with high dimensional accuracy and has a coefficient of linear thermal expansion substantially equal to that of an optical fiber, it is suitable as the material for the center tube to be embedded in the ferrule into which the optical fiber is fitted. That is to say, the optical connector ferrule having excellent resistance to environment can be obtained without incurring such problems that an end face of the optical fiber protrudes from the end face of the ferrule or the optical fiber separates from the ferrule due to the deterioration of an adhesive caused by the heat cycle in the use.

As a material for the body of the ferrule, it is freferable that an amorphous alloy should be used, as mentioned above. An amorphous alloy possesses highly accurate castability and machinability and, therefore, allows manufacture of a product of smooth surface faithfully reproducing the contour of the cavity of the mold by the metal mold casting method or molding method. Accordingly, the ferrules of the metal tube built-in type and/or the center tube built-in type and/or the optical fiber built-in type which satisfy dimensional prescription, dimensional accuracy, and surface quality can be manufactured by a single process with high mass productivity insofar as the metal mold to be used is suitably prepared.

Although the amorphous alloy does not need to be limited to any particular substance but may be any of the alloys insofar as they have at least a glass transition region, the amorphous alloy having a composition represented by either one of the following general formulas (1) to (6) may be advantageously used.

$$M^1_a M^2_b Ln_c M^3_d M^4_e M^5_f \qquad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

The above amorphous alloy includes those represented by the following general formulas (1-a) to (1-p).

$$M^1_a M^2_b \qquad (1\text{-}a)$$

This amorphous alloy has large negative enthalpy of mixing and good producibility of the amorphous structure due to the coexistence of the $M^2$ element and Zr or Hf.

$$M^1_a M^2_b Ln_c \qquad (1\text{-}b)$$

The addition of a rare earth element to the alloy represented by the above general formula (1-a), as in this amorphous alloy, enhances the thermal stability of the amorphous structure.

$$M^1_a M^2_b M^3_d \quad (1\text{-}c)$$

$$M^1_a M^2_b Ln_c M^3_d \quad (1\text{-}d)$$

The filling of gaps in the amorphous structure with the $M^3$ element having a small atomic radius (Be, B, C, N, or O), as in these amorphous alloys, makes the structure stable and enhances the producibility of the amorphous structure.

$$M^1_a M^2_b M^4_e \quad (1\text{-}e)$$

$$M^1_a M^2_b Ln_c M^4_e \quad (1\text{-}f)$$

$$M^1_a M^2_b M^3_d M^4_e \quad (1\text{-}g)$$

$$M^1_a M^2_b Ln_c M^3_d M^4_e \quad (1\text{-}h)$$

The addition of a high melting metal, $M^4$ (Ta, W, or Mo) to the above alloys, as in these amorphous alloys, enhances the heat resistance and corrosion resistance without affecting the producibility of the amorphous structure.

$$M^1_a M^2_b M^5_f \quad (1\text{-}i)$$

$$M^1_a M^2_b Ln_c M^5_f \quad (1\text{-}j)$$

$$M^1_a M^2_b M^3_d M^5_f \quad (1\text{-}k)$$

$$M^1_a M^2_b Ln_c M^3_d M^5_f \quad (1\text{-}l)$$

$$M^1_a M^2_b M^4_e M^5_f \quad (1\text{-}m)$$

$$M^1_a M^2_b Ln_c M^4_e M^5_f \quad (1\text{-}n)$$

$$M^1_a M^2_b M^3_d M^4_e M^5_f \quad (1\text{-}o)$$

$$M^1_a M^2_b Ln_c M^3_d M^4_e M^5_f \quad (1\text{-}p)$$

These amorphous alloys containing a noble metal, $M^5$ (Au, Pt, Pd, or Ag) will not be brittle even if the crystallization occurs.

$$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$.

The above amorphous alloy includes those represented by the following general formulas (2-a) and (2-b).

$$Al_{100-g-h-i} Ln_g M^6_h M^3_i \quad (2\text{-}a)$$

This amorphous alloy has large negative enthalpy of mixing and good producibility of the amorphous structure.

$$Al_{100-g-h-i} Ln_g M^6_h M^3_i \quad (2\text{-}b)$$

This amorphous alloy has a stable structure and enhanced producibility of the amorphous structure due to the filling of gaps in the amorphous structure with the $M^3$ element having a small atomic radius (Be, B, C, N, or O).

$$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$.

This amorphous alloy has large negative enthalpy of mixing and good producibility of the amorphous structure.

$$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

The filling of gaps in the amorphous structure of the alloy of the above general formula (3) with the $M^8$ element having a small atomic radius (Al, Si, or Ca), as in this amorphous alloy, makes the structure stable and enhances the producibility of the amorphous structure.

$$Mg_{100-q-s} M^7_q M^9_s \quad (5)$$

$$Mg_{100-q-r-s} M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The addition of a rare earth element to the alloy of the general formula (3) or (4) mentioned above, as in these amorphous alloys, enhances the thermal stability of the amorphous structure.

Among other amorphous alloys mentioned above, the Zr-TM-Al and Hf-TM-Al (TM: transition metal) amorphous alloys having very wide differences between the glass transition temperature (Tg) and the crystallization temperature (Tx) exhibit high strength and high corrosion resistance, possess wide supercooled liquid ranges (glass transition ranges), $\Delta Tx = Tx - Tg$, of not less than 30 K, and extremely wide supercooled liquid ranges of not less than 60 K in the case of the Zr-TM-Al amorphous alloys. The $Zr_{60}Al_{15}Co_{2.5}Ni_{7.5}Cu_{15}$ alloy (Tg: 652K, Tx: 768K), for example, has such an extremely wide $\Delta Tx$ as 116 K. In the above temperature ranges, these amorphous alloys manifest very satisfactory workability owing to viscous flow even at such low stress not more than some tens MPa. They are characterized by being produced easily and very stably as evinced by the fact that they are enabled to furnish an amorphous bulk material even by a casting method using a cooling rate of the order of some tens K/s. After a further study in search of uses for these alloys, it has been ascertained that by the metal mold casting from a melt, these alloys produce amorphous materials and permit very faithful reproduction of the shape and size of a molding cavity of a metal mold and, with the physical properties of the alloys as a contributory factor, befit the ferrules of the metal tube built-in type and/or the center tube built-in type and/or the optical fiber built-in type.

While certain specific embodiments of the ferrules of the metal tube built-in type and/or the center tube built-in type and/or the optical fiber built-in type have been described hereinbefore, the present invention is not limited to these embodiments. As mentioned above, the body of the ferrule is made of an amorphous alloy. When the mount for attachment to a module is also made of an amorphous alloy, the weldability between the ferrule and the mount can be secured even if the outer surface of the ferrule body is not covered with a metal tube. Accordingly, the present invention includes such an embodiment. As a matter of course, in this embodiment the ferrule may also be in the form of the center tube built-in type and/or the optical fiber built-in type as mentioned above.

Furthermore, the ferrules of the metal tube built-in type and/or the center tube built-in type and/or the optical fiber built-in type mentioned above can be applied not only to the butterfly type LD module as shown in FIG. 1 but also to other LD modules and to the optical connectors for connecting the optical fibers by abutting the end faces of the ferrules to each other.

The described embodiments are therefore to be considered in all respects as illustrative and not restrictive, the scope of the invention being indicated by the appended claims rather than by the foregoing description and all changes which come within the meaning and the range of equivalency of the claims are, therefore, intended to be embraced therein.

The disclosure in Japanese Patent Application No. 2001-197175 of Jun. 28, 2001 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. An optical connector comprising a mount having an accommodating portion and an optical connector ferrule attached to the mount, wherein said mount is provided with a lens disposed in said accommodating portion so as to be aligned with said optical connector ferrule, said optical connector ferrule comprising a body and a surface part covering an outer surface of said body, said body of the optical connector ferrule being made of an amorphous alloy, and said mount and at least said surface part of said optical connector ferrule are made of the same kind of material and are integrally joined to each other by welding.

2. The optical connector according to claim 1, wherein both said mount and said surface part of the optical connector ferrule are made of an amorphous alloy.

3. The optical connector according to claim 1, wherein both said mount and said surface part of the optical connector ferrule are made of a metal.

4. An optical connector ferrule, comprising a body made of an amorphous alloy having at least a glass transition region and a surface part of a metal material covering an outer surface of said body and fixedly and integrally joined to said body.

5. The optical connector ferrule according to claim 4, further comprising an optical fiber incorporated therein as an integral part thereof along the axis of said ferrule.

6. The optical connector ferrule according to claim 5, wherein said optical fiber extends in the interior of said optical connector ferrule from one end to the other end of said ferrule and further continuously extends outward from one end of said optical connector ferrule.

7. The optical connector ferrule according to claim 4, further comprising a center tube incorporated therein as an integral part thereof along the axis of said ferrule.

8. The optical connector ferrule according to claim 7, wherein said center tube is made of a metal or ceramics.

9. The optical connector ferrule accordingly to claim 4, comprising a body made of an amorphous alloy having at least a glass transition region, a metal tube covering an outer surface of said body as an integral part thereof, a center tube embedded in said body in the longitudinal direction thereof, and an optical fiber integrally fixed in said center tube.

10. The optical connector ferrule according to claim 4, wherein said body is made of a substantially amorphous alloy having a composition represented by either one of the following general formulas (1) to (6) and containing an amorphous phrase in a volumetric ratio of at least 50%:

$$M^1_a M^2_b Ln_c M^3_d M^4_e M^5_f \qquad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag: and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i} Ln_g M^6_h M^3_i \qquad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$, $$Mg_{100-p} M^7_p \qquad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \qquad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s} M^7_q M^9_s \qquad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \qquad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

11. An optical connector comprising a mount having an accommodating portion and an optical connector ferrule attached to the mount, wherein said mount is provided with a lens disposed in said accommodating portion so as to be aligned with said optical connector ferrule, said optical connector ferrule comprising a body, and a surface part covering an outer surface of said body, said surface part of said ferrule is integrally joined to said mount by welding, and all of said mount and said body and said surface part of the optical connector ferrule are made of an amorphous alloy having a composition represented by either one of the following general formulas (1) to (6) and containing an amorphous phase in a volumetric ratio of at least 50%:

$$M^1_a M^2_b Ln_c M^3_d M^4_e M^5_f \quad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$, $$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s} M^7_q M^9_s \quad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

* * * * *

UNITED STATES PATENT AND TRADEMARK OFFICE
CERTIFICATE OF CORRECTION

PATENT NO. : 6,758,602 B2
DATED : July 6, 2004
INVENTOR(S) : Tadashi Yamaguchi et al.

It is certified that error appears in the above-identified patent and that said Letters Patent is hereby corrected as shown below:

Column 11,
Line 57, "accordingly" should read -- according --.
Line 67, "phrase" should read -- phase --.

Column 12,
Line 14, "Ag:" should read -- Ag; --.
Line 53, after "$3 \leqq s \leqq 25$," insert a space.

Column 13,
Line 30, "$Al_{100-g-h-i}Ln_g M^6_h M^3_i$," should read -- $Al_{100-g-h-i}Ln_g M^6_h M^3_i$ --.

Column 14,
Line 9, "$Mg_{100-q-r}M^7_q M^8_r$," should read -- $Mg_{100-q-r}M^7_q M^8_r$ --.

Signed and Sealed this

Eighth Day of February, 2005

JON W. DUDAS
*Director of the United States Patent and Trademark Office*